United States Patent [19]
Borgato

[11] Patent Number: 5,950,178
[45] Date of Patent: Sep. 7, 1999

[54] DATA PROCESSING SYSTEM AND METHOD FOR FACILITATING TRANSACTIONS IN DIAMONDS

[76] Inventor: Sergio Borgato, 7984 Rancho Distino, Las Vegas, Nev. 89123

[21] Appl. No.: 08/902,524
[22] Filed: Jul. 29, 1997
[51] Int. Cl.⁶ .................................................. G06F 17/60
[52] U.S. Cl. .............................. 705/37; 705/35; 707/100; 707/102; 707/104
[58] Field of Search .................................. 705/1, 35, 37; 707/100, 102, 104

[56] References Cited

U.S. PATENT DOCUMENTS

| | | | |
|---|---|---|---|
| 5,124,935 | 6/1992 | Wallner et al. | 347/225 |
| 5,828,405 | 10/1998 | Vanier et al. | 348/61 |

Primary Examiner—Edward R. Cosimano
Attorney, Agent, or Firm—Quirk & Tratos

[57] ABSTRACT

A data processing system and method for facilitating transactions in precious stones such as diamonds is set forth. A host processor stores data input by a seller from a remote terminal for a stone to be sold based upon weight, cut shape, cut quality and a matrix of color and clarity. From remote terminals sellers may input data to list stones which they offer for sale with the offer price and buyers make bids. The host processor stores the data which may be remotely viewed at remote terminals which reproduce the matrix and show the lowest offer price, highest bid price and last sales price for each category of the matrix. When a bid and offer match for a listed stone, confirmation is issued to the buyer and seller to confirm the sale. A third party escrow will receive the sold stone and payment and thereafter distribute it to the receiving party.

21 Claims, 8 Drawing Sheets

|  | FL | IF | WS₁ | WS₂ | VS₁ | VS₂ | SI₁ | SI₂ | SI₃ | I₁ | I₂ |
|---|---|---|---|---|---|---|---|---|---|---|---|
| D | 90<br>88<br>86 | 72<br>70<br>68 | 65<br>63<br>62 | 52<br>54<br>56 | | | | | | | |
| E | 72<br>70<br>69 | | | | | | | | | | |
| F | 68<br>64<br>63 | | | | | | | | | | |
| G | 59<br>56<br>56 | | | | | | | | | | |
| H | | | | | | | | | | | |
| I | | | | | | | | | | | |
| J | | | | | | | | | | | |
| K | | | | | | | | | | | |
| L | | | | | | | | | | | |
| M | | | | | | | | | | | |

DATA PROCESSING SYSTEM AND METHOD FOR FACILITATING TRANSACTIONS IN DIAMONDS

FIELD OF THE INVENTION

The present invention relates to data processing systems and methods for facilitating transactions involving precious stones. More particularly, it relates to such systems and methods facilitating transactions for diamonds.

BACKGROUND OF THE INVENTION

Diamonds, are substantially unique. Each has natural attributes such as color and clarity as well as attributes and features contributed when the diamond is cut and polished. When a diamond is cut, one factor contributing to its value is the cut weight of the stone. There are other factors relating to the nature and the grade of the cut. For example, for round cut and polished diamonds, the following factors relating to the cut contribute to the presentation of the diamond and hence its value: depth ratio (the top to bottom dimension/diameter), table ratio (the diameter of the top flat/diameter), crown angle (the angle from the girdle to the top flat), pavillion angle (the angle from the girdle to the bottom), crown height ratio (the distance from the flat to the girdle/the top to bottom dimension), girdle ratio (the width of the girdle/depth) and culet ratio (culet diameter/diameter). The girdle is the outside perimeter of stone and may be sharp defining a crisp perimeter about the stone or may be somewhat cylindrical. The culet is a flat formed at the bottom of the stone. The aforementioned factors determine whether the cut is anywhere from excellent to an evaluation if the stone should be recut. Additional factors may contribute to the overall value of the stone.

The unique nature of diamonds has frustrated any effort to develop a system or method by which remotely located sellers and buyers can deal. Typically sellers and buyers must simply develop personal contacts. A seller having an inventory of diamonds, cut or uncut, must find a willing buyer. The buyer will then examine and evaluate the diamonds (or send them to a laboratory for evaluation). If a diamond is thereafter desired by the buyer, the price must be negotiated. Experienced buyers and sellers have a fair idea of what a diamond of certain characteristics is worth. However, there is no market study or actual sales histories of like diamonds to provide more precise, up to data guidance as to a fair price to either the buyer or seller. It has been known for dealers in diamonds to refer to a "Rapport Diamond Report" which, based upon weight, color and clarity, provides a listing of an opinion as to what the current asking price is for certain cut diamonds are. The report does not reflect actual sales prices, does not represent actual offers to sell or bids to buy diamonds nor does it take into account certain factors important in evaluating diamonds.

Thus, buyers and sellers cannot be sure that the negotiated price for a diamond reflects the actual, current market value. Novice sellers and buyers may be left to the mercy of more experienced dealers. Further, novice sellers and buyers may have difficulty penetrating the existing personal contact-based market.

Still further, the absence of any real-time listing of current transactions, offers and bids regarding diamonds of specific characteristics has frustrated the efforts of occasional dealers in gems to determine a fair price. For example, pawn brokers, estate appraisers and financial institutions may need guidance in determining what the sale of a stone of certain characteristics would likely bring if sold on the market.

There is a need for a data processing system and method for listing on a world-wide basis actual offers to sell precious stones such as diamonds which takes into account the various factors effecting price, which permits buyers to make bids on specific stones, which permits buyers and sellers to adjust offers and bids to eventually enter into a sales transaction and which facilitates the handling of the aforesaid sales transactions. Such a system would permit sellers to list stones such as diamonds for sale anywhere in the world and would permit buyers anywhere in the world to bid on diamonds having certain characteristics. The beneficial result of such a system and method would be to establish a real-time, world-wide system and method for facilitating diamond transactions.

SUMMARY OF THE INVENTION

There is, therefore, set forth according to the present invention a data processing system for listing and facilitating transactions involving precious stones such as diamonds which are categorized by weight and at least one other characteristic such as cut, color, clarity or the like. The system includes a host processor having a first data structure storing, for each diamond to be offered for sale through the system, data representative of the diamond weight, the diamond characteristic(s), offer price and the identification of the seller. The host processor includes means for arranging the data into a data matrix array wherein diamond data for like weights and like characteristics is assigned to a designated category position in the array. The host processor also includes means to compare the price for the diamonds offered for sale at each category position in the array to determine the lowest offer price for a diamond in that category and to assign the data for the lowest price diamond a primary offer position in the array category.

Remote terminals are linked through a suitable data link to the host processor. Each terminal includes a display, processor and means for inputting data to be transmitted through the link to the processor. By suitable means such as disks or off-loading software from the world-wide web, each terminal is programmed to be compatible and communicate with the host processor and to generate certain displays. Once the terminal processors are programmed, buyers and sellers initiate communication with the host processor through their terminal. In response to initiation of communication with the host processor, the host processor issues signals to the linked terminals processors to generate a display corresponding to the data matrix array. For each position in the array where a diamond is offered for sale, the host processor issues data to the terminal generated displays to display at each category position the offer price for the diamond data assigned to the primary offer position in that array category.

Means are provided for a seller of a diamond to communicate with the host processor to input the aforesaid diamond data. The host processor in receipt to the data, arranges the data into the data matrix array and compares the offer price to the prices of other diamonds listed in the array category to determine the lowest priced diamond of that category and assign that diamond to the primary offer position. Thus, for example, should a seller offer a diamond of a certain category for sale at a price less than those previously posted to the array category, that seller's diamond will be assigned the primary offer position and the generated display will reflect a new lowest offer price at that array category position.

For a buyer to view the diamonds offered for sale, means are provided to select a category position from the matrix array at the terminal display, the host processor in response to selection of a category position displaying at least the diamond data of weight, the listed characteristic(s) and price of the diamond assigned to the primary position. Preferably, the system lists all diamonds assigned to the category position based in order of price, from lowest to highest, and for identically priced diamonds, based upon chronological order of the posting of the diamond for sale. Means are provided for the buyer to enter a bid price for at least the diamond assigned to the primary position in the selected array category. In response to communication of a bid, the host processor includes means to compare the bid with the displayed offer price of the diamond assigned to the primary position. If the bid matches the offer price, the processor includes means to communicate over the data link to the identified seller and buyer of the diamond that a sale has been made and that a transaction is to be consummated. These means also remove the diamond data for the sold diamond from the data matrix whereupon the comparing means compare the offer prices for the remaining diamonds in the category position and reassign the next lowest priced diamond to the primary offer position in the array category. If the bid is lower than the displayed offer price, the processor includes means to store the bid in the array category and compare the bid with other stored bids to determine the highest bid for the category. The highest bid is assigned a primary bid position at the array category and preferably is displayed with display of the matrix at the corresponding category position. Thus, for offers and bids in an array category, the lowest offer and the highest bid will be displayed.

Preferably, when a transaction has been consummated, the transaction price is stored at the host processor in a suitable data storage file and the last sales price is likewise displayed at the corresponding array category position. Thus, not only are the lowest offer and highest bid displayed but also the last transaction price is displayed as well. Still more preferably, for each category, the host processor includes means to display a historical record of sales in that category. This record may be displayed in chart form or any other suitable display.

Preferably where the system relates to cut and polished diamonds, the diamond data includes weight classes or groups, for each weight group, subclasses for shape of cut, for each shape of cut, sub-subclasses for cut grade and for each cut grade a data matrix based upon color and clarity. Thus, each diamond is defined by assigning it to a weight class, cut shape, cut grade and is still further defined by assigning it to a position in a matrix of color and clarity.

The method according to the present invention includes providing a host processor having a first data structure storing for each stone offered for sale data of stone weight, stone characteristics, offer price and seller identification data, the processor arranging the data into a data matrix array wherein stone data for like weights and like characteristics is assigned to a designated category position in an array. The host processor compares the price to determine the lowest offer price for a stone offered in a category position of the array for the lowest determined offer price, and assigns that stone data to a primary offer position in the array category. The method includes linking terminals, each including a processor and display and data entry device, to the host processor by which sellers and buyers may initiate communication with the host processor, the host processor in response to initiation of communication issuing signals to the terminal processors which display a matrix corresponding to the data matrix array and for each array category the offer price of the stone data assigned to the primary position.

A seller of a stone such as a diamond communicates with the host processor from a terminal to input the stone data for a stone to be offered for sale. The host processor for each new stone offered, executes the comparing step to determine the stone data to be assigned to the primary offer position. The buyer selects a category position from the matrix at the display, the host processor in response to selection displaying at least the stone data for the stone assigned to the primary offer position. The buyer, should he/she desire to enter a bid, communicates a bid to the host processor. The host processor in response to receipt of a bid, compares the bid with the displayed offer price and if the bid matches the offer price, the processor confirms over the data link to the identified seller an identified buyer that a sale has been made and removes the stone from the data matrix category. The processor re-executes the comparing step to determine the stone data to be assigned to the primary position. If the bid is lower than the displayed offer price, the processor stores the bid in the corresponding array category and compares the bid with other stored bids to determine the highest bid for the category. The highest bid is assigned to a primary bid position at the array category and preferably is displayed in that category.

As can be appreciated, the system and method according to the present invention is adapted to generate a display which lists in real-time the current market for stones such as diamonds assigned to each category position in the defining matrix array. Buyers and sellers can see the current lowest offers, highest bids and last transaction prices in each category. Sellers can enter new stones into the system, can alter their offers by lowering or raising them and buyers can enter bids, lowering and raising them as well. When an offer and bid match, a transaction is consummated and notification is issued to the identified seller and buyer. Where the host processor is maintained at a clearing house, the clearing may facilitate the actual transaction by acting as an escrow to receive funds and the stone and thereafter distribute them to the appropriate receiving party. The clearing house can also act to verify the characteristics of the subject stone if so desired. For providing the host processor and acting as an escrow the clearing house can exact a fee for each transaction. Preferably the fee is based upon the weight of the stone sold.

As stated above, not only can dealers in diamonds deal with each other through the market through the system and method according to the present invention but others may use the system to appraise stones.

BRIEF DESCRIPTION OF THE DRAWINGS

These and other features and advantages will become appreciated if the same becomes better understood with reference to the specification, claims and drawings wherein:

FIG. 7 shows a master/offer display generated by the system and method according to the present invention;

FIG. 9 is a master/bid display generated according to the system and method of the present invention.

DESCRIPTION

The drawings illustrate the system and method according to the present invention. While the present invention is described in relation to gems which are cut and polished diamonds, it is to be understood that it could be used with other stones such as rubies, emeralds, amethyst or other precious stones and could include uncut stones as well.

Figure 1:
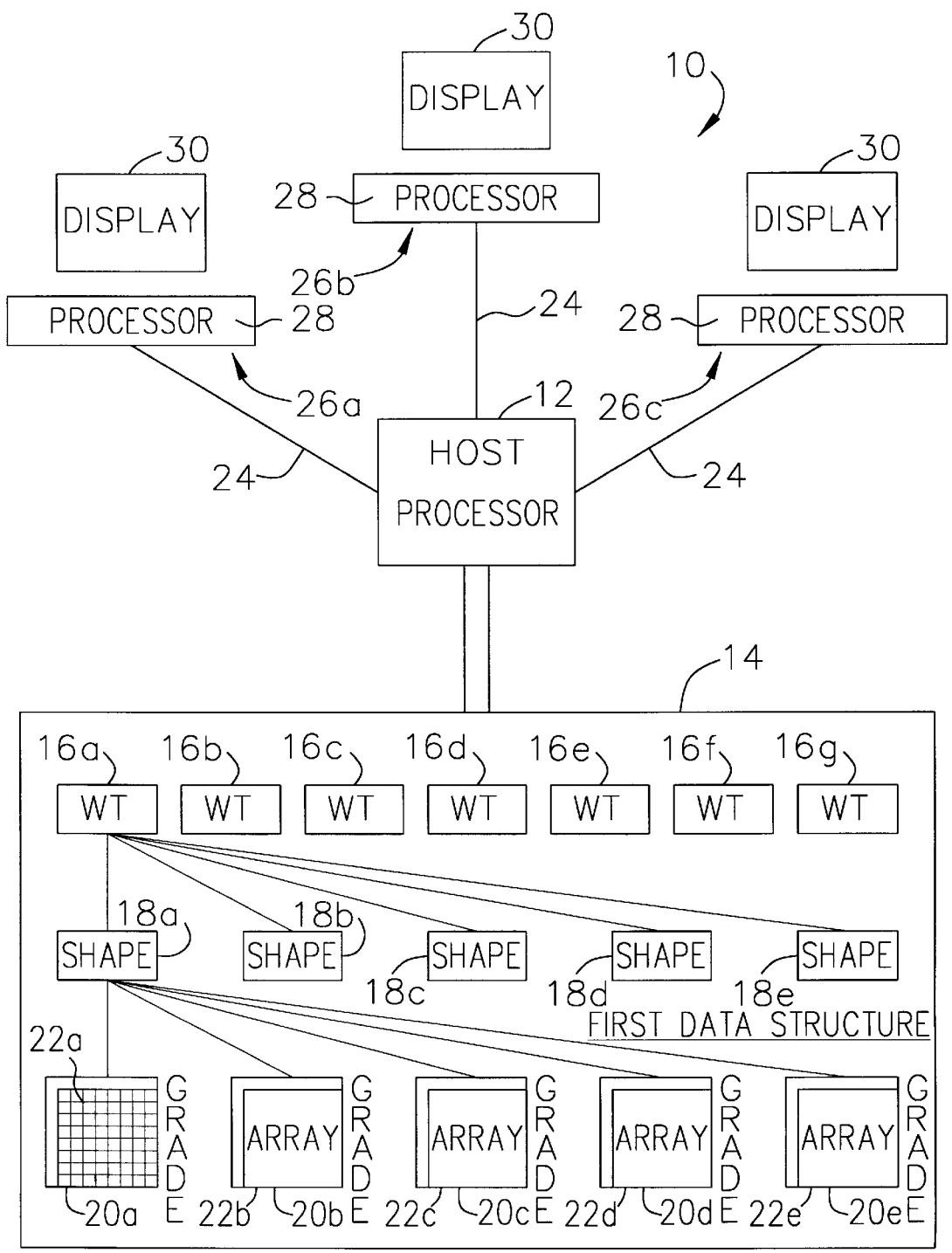
FIG. 1 illustrates and overall view of the system and method according to the present invention.

With reference to FIG. 1, the data processing system 10 according to the present invention is illustrated. The system 10 includes a host processor 12 which may be a processor of a type similar to a 200 PENTIUM PRO® or any other compatible processor. Preferably the host processor 12 is maintained at a clearing house which, as described below, not only maintains and services the host processor 12 but also will act as an escrow to handle the physical transfer of diamond and money to the buyer and seller, respectively.

The host processor 12 is programmed and configured to establish a first data structure 14 for arranging and storing various data relating to diamonds to be offered for sale as well as other data concerning those diamonds. Preferably the first data structure 14 establishes a plurality of weight classes 16a–16g by carat weight of the stone to be offered for sale. For example, the first data structure 14 may be configured to include the weight classifications of Table 1.

TABLE 1

| WEIGHT CLASS | WEIGHT CLASS |
|---|---|
| 0.001–0.17 | 1.80–1.99 |
| 0.18–0.22 | 2.00–3.99 |
| 0.23–0.29 | 4.00–4.99 |
| 0.30–0.44 | 5.00–5.99 |
| 0.45–0.49 | 6.00–7.99 |
| 0.50–0.59 | 8.00–9.99 |
| 0.60–0.69 | 10.00–11.99 |
| 0.70–0.85 | 12.00–14.99 |
| 0.86–0.89 | 15.00–19.99 |
| 0.90–0.95 | 20.00–24.99 |
| 0.96–0.99 | 25.00–29.00 |
| 1.00–1.79 | 30.00–39.99 |
|  | 40.00–49.99 |

While FIG. 1 shows only seven weight classes, it is to be understood that there would be additional classes based upon Table 1. Furthermore, it is to be understood that any other weight classes could be used.

With continuing reference to FIG. 1, for each weight class 16a–16g the first data structure 14 defines a plurality of cut shape subclasses 18a–18e. For example, shape subclass 18a may be for round cut stones, 18b for emerald cut stones, 18c for oval cut stones, 18d for marquee cut and so forth. While only five shape subclasses 18a–18e are shown in FIG. 1, it is to be understood that more or less could be provided. It is also to be understood that a shape subclass could be established for uncut or industrial grade stones as well.

For each shape subclass 18a–18e, a plurality of cut grade sub-subclasses 20a–20e are provided. The cut grade sub-subclasses 20a–20e range from recut, indicating that the stone should be recut, to excellent. Unlike the descriptive shape subclasses which are well known, the cut grades established herein have, to my knowledge, not heretofore been used. Table 2 below shows how cut grade sub-subclasses 20a–20e are determined in relation to round cut stones.

TABLE 2

| Cut | Excellent | Very Good | Good | Fair | Recut |
|---|---|---|---|---|---|
| Totak Depth % | 59.00–62.40 | 58.00–63.80 | 56.80–65.90 | 54.00–70.10 | 53.90–70.20 |
| Table % | 53.00–58.00 | 52.00–63.00 | 50.00–67.00 | 49.00–72.00 | 48.00–73.00 |
| Crown Angle | 33.00–35.00 | 32.00–36.00 | 30.00–38.00 | 26.00–44.00 | 25.00–45.00 |
| Pavillon Angle | 40.00–40.75 | 40.00–41.20 | 39.00–42.00 | 38.00–45.00 | 37.00–49.00 |
| Pavillon Depth % | 42.00–44.00 | 42.00–45.00 | 41.00–47.00 | 39.00–48.00 | 38.00–49.00 |
| Crown Height % | 0.00–99.00 | 0.00–99.00 | 0.00–99.00 | 0.00–99.00 | 0.00–99.00 |
| Girdle % | 0.51–2.95 | 0.00–2.96 | 0.00–5.80 | 0.00–6.50 | 0.00–7.50 |
| Cutlet % | 0.00–1.50 | 0.00–2.50 | 0.00–3.75 | 0.00–4.00 | 0.00–5.00 |

For each cut grade sub-subclass 20a–20e there is defined a data matrix array 22a–22e (the array shown only in detail with reference to array 22a), the columns of which show gradations of clarity with the rows being color. The gradations of clarity range from FL (flawless) to $I_3$ which are poorer stones. The clarity gradations are: FL, IF, $VVS_1$, $VVS_2$, $VS_1$, $VS_2$, $SI_1$, $SI_2$, $SI_3$, $I_1$, $I_2$, and $I_3$. These gradations are known in the art.

Color ranges from grades or categories, D through O, and like clarity, these color grading letter designations are well known in the art.

Thus, the first data structure 14 can define each unique diamond by determining the weight class 16a–16g, cut shape subclass 18a–18e, cut grade sub-subclass 20a–20e and color and clarity. With this configuration data relating to diamonds having particular characteristics can be assigned or linked to a unique position or category in the corresponding array and accessed therefrom.

As hereinafter set forth, the data arranged or linked by the host processor 10 into the corresponding matrix category also includes data identifying the seller of the diamond as well as the seller's price at which he offers to the diamond (hereinafter the "offer price"). Accordingly, any buyer or seller going to the appropriate data matrix array category can access data of diamonds having like characteristics and weights and can also access at least the offer prices for those diamonds.

As hereinafter described, the host processor 12 is controlled and monitored by a clearing house.

With continuing reference to FIG. 1, the system 10 includes communication links 24 to link the host processor 12 to terminals 26a–26c. Each of the links may be to remote terminals through telephone lines, satellite connection or the like. Each of the terminals 26a–26c include a data processor 28 and a display 30. The processor 28 is preferably a personal computer having the following requirements: capable of running WINDOWS 95® or WINDOWS NT® operating systems 4.0, 8 megabytes of RAM, a 14.4 Baud modem or faster, run Microsoft web browser INTERNET EXPLORER® 3.00 or higher, have dial-up networking and have a display setting at 800×600 or higher. As can be appreciated, the processor 28 and displays 30 can be any well-known, suitable personal computer system.

Establish Communication

To operate the system 10 a buyer or seller of a diamond or an interested party must establish an account with the host processor 12 by providing appropriate identification information. The clearing house operating and maintaining the host processor 12 assigns for each account a name and one or more passwords to provide a secure access to the host processor 12. When an account has been established the user first programs their processor 28 with software to transmit, receive and manipulate data sent and received from the host processor 12 and to generate the displays as hereinafter described. The programming of the processor 28 software may be by providing a software disk to the user or preferably by the user, through the Internet, downloading operating software from the host processor 12 in a known manner. When the terminal processor 28 has been suitably programmed, the user may establish communication with the host processor 12 and use the system 10.

The communication link 24 is established by making a telephone connection or satellite link to the host processor 12 in any known fashion. Upon initial connection the host processor 12 prompts the user to input their name and assigned password to the host processor 12 which, in a method similar to that used in network processing initializes the operative communication between the terminal 28 and the host processor 12. The host processor 12 compares the input data to the established account data to determine if the user attempting to come online is authorized. If the user is not authorized, he/she cannot make an operative connection to the host processor 12. When operative communication has been established the host processor 12 issues data signals to the connecting terminal 26a–26c processor 28 causing the processor 28 to create at display 30 a graphic master display 32 as suggested in FIG. 6. The details of the master display 32 will be hereinafter described as certain elements thereof are used according to the system and method of the present invention. Master display 32, which may be operated in a WINDOWS™ format, includes an identification location 34 which identifies the user's account input at the initial connection prompt. This data specifically identifies the user and may represent a corporate account or individual account 36 or an individual salesman operating under a corporate account depending upon the user's name and password input. The system 10 includes means for the user to select at company account selection 38 a company account or an individual user's account, that selection being made by a mouse input which sends an appropriate signal to the host processor 12 over the link 24.

Also the master display 32 includes means for the user to select a floor selection and a transaction manager. By using a mouse, the user at floor selection 40 inputs data to select between a display of the single or individual diamonds offered for sale and those which are offered in lots or parcels. For purposes of explanation, the master display 32 indicates that the user has selected at floor selection 40 data relating to single or individual diamonds offered for sale. The transaction manager 42 enables the user to input a selection between offers, bids and trades. Upon the selection and transmittal of the selection data to the host processor 12, the host processor 12 retrieves from its data files all prior offers or bids or trades of this user which it has stored in an assigned user file. This data as retrieved by the host processor 12 is displayed at master display 32 in transaction display 44 of the master display 32 as suggested in FIG. 6.

Figure 6:
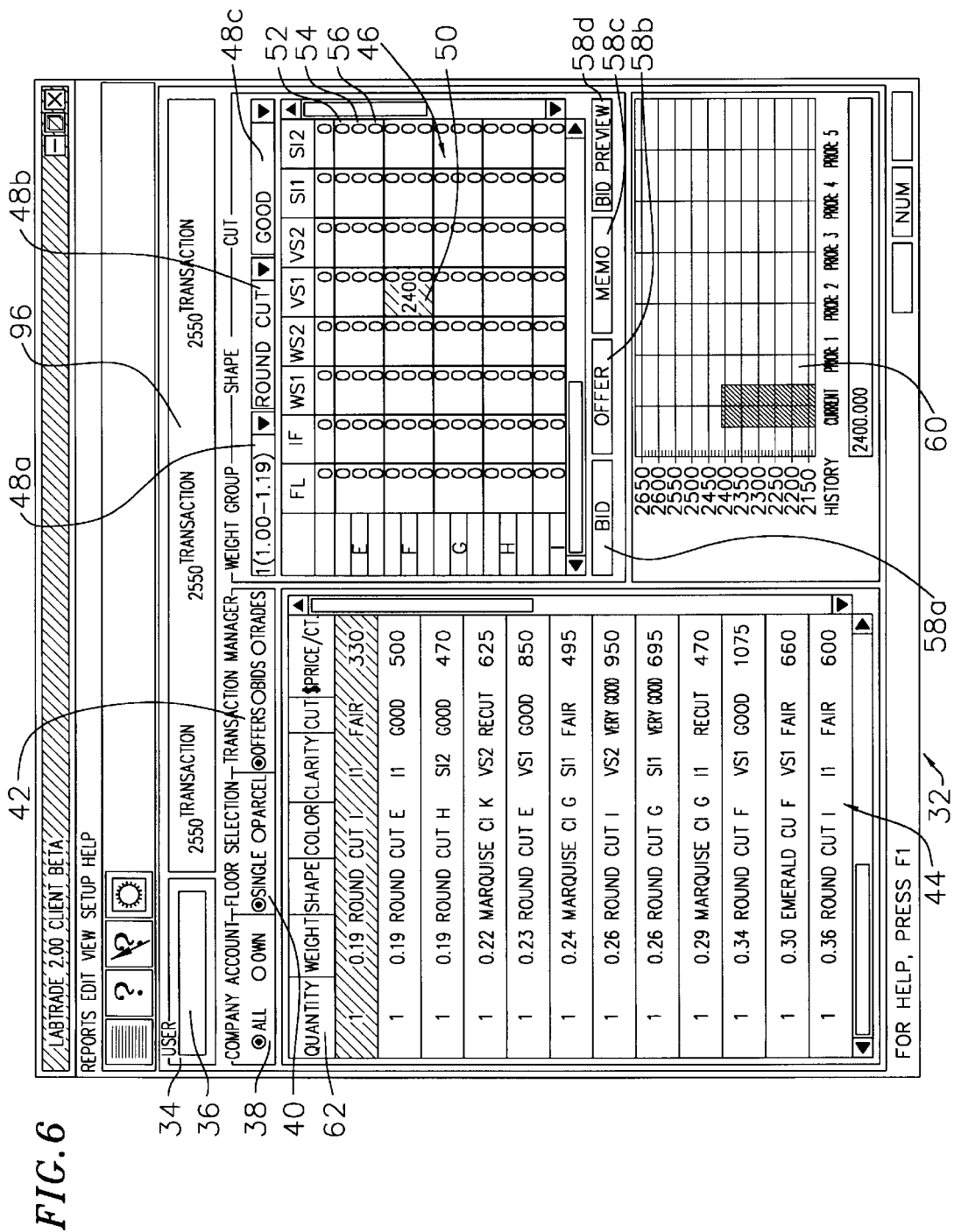
FIG. 6 shows a master display generated according to the system and method of the present invention.

Also with reference to the master display 32 of FIG. 6, there is shown at array display 46 the selected data matrix array 22a–22e of the first data structure 14. The data matrix array, for example data matrix array 22a, shown at array display 46 is subdivided by columns of clarity designators and rows of color designators of the nature described above. The intersection of any column and row defines a color/clarity category for the data matrix array 22a.

With continuing reference to the master display 32 of FIG. 6, the host processor 12 also issues data to the terminals 26a–26c to display adjacent to the array display 46 weight, shape and cut grade selections 48a–48c. As indicated, the user can scroll through the various weight classes using a mouse or other suitable data entry device, the transmission of such data directing the host processor 12 to issue signals scrolling through the various weight classes 16a–16g. As illustrated in master display 32 in FIG. 6, weight class 1 has been selected which corresponds to weight of between 1.00–1.119 carats. The shape selection in a similar matter enables the user to input data to the host processor 12 to prompt the host processor to issue signals to scroll through the various shape classes 18a–18e present in the first data structure 14 available. As shown in FIG. 6, the user has selected the round cut shape subclass 18a. With continuing reference to FIG. 6, the cut grade selection enables the user to enter data to urge the host processor 12 to scroll through the various cut grade sub-subclasses 20a–20e. In this example, the user has selected a good sub-subclass cut grade. As can be appreciated, when the user has selected the weight class, shape subclass and cut grade sub-subclass, the appropriate data matrix array 22a–22e is displayed at array display 46. Selection of other weight classes, shape or cut grades subclasses will drive the host processor 12 to issue data signals to arrange the display of data such that the display 30 displays the array display 46. Suffice it to say, the data relating to any stone to be offered for sale would be arranged to figuratively occupy a category on the data matrix array, e.g. array 22a. As shown in the master display 32 a category 50 which would contain data for diamonds falling in the weight class, shape subclass and cut grade sub-subclass as well as having a color designation F and clarity designation $VS_1$.

With continuing reference to the array display 46, there is seen in each category in the array 22a a location to display an offer price 52, last transaction or sales price 54 and bid price 56. While the array display 46 shows that in many of the categories the offer, sales and bid prices 54, 56 are zero, as will hereinafter be understood, these numbers will vary based upon the activity concerning diamonds in the category.

Continuing with FIG. 6, the processor 28 software drives the display 30 to show, below the array display 46, certain selections 58a–58d identified as "bid", "offer", "memo", and "bid preview". The user by selecting at their terminal 26a–26c one of these represented buttons can prompt the host processor 12 causing the host processor 12 to issue selected data signals to the user's processor 30 to control and arrange the input of data into the system 10 and more particularly the host processor 12 and first data structure 14.

Below the selections 58a–58c is displayed a graph chart 60 which as hereinafter described will display data concerning the historical sales in any selected category. For example, as illustrated, for the category 50 of the array display 46, the most recent sales price 54 of 2400 (e.g. $2400.00) is displayed. The chart 60 reflects that 2400 figure.

Continuing with FIG. 6, the transaction display 44 includes headers 62 which are displayed to identify the data contained in the transaction display 44. These headers are shown as "quantity", "weight", "shape", "color", "clarity", "cut" (cut grade) and price per carat. As illustrated in FIG. 6, since the user has selected "offers" in the single floor, the transaction display 44 has displayed all of the offers presently posted by this user and stored in this user's assigned data storage file. The postings may be arranged in any suitable order however, as shown, they are arranged based upon weight. The data is also arranged in columns below the headers 62 for convenience. The user may scroll through the transaction display 44 to view all of the offers that it has currently posted in the system 10 and method according to the present invention.

In a similar fashion a buyer could preview all of the bids that it has made for stones listed in the system 10 according to the method of the present invention by selecting "bid" at transaction manager prompt 42. The user could also, by selecting "trades" at transaction manager prompt 42, view all of the purchases or sales actually made and consummated by the user.

Using The System/Method—Entering An Offer To Sell A Diamond

Figure 7:
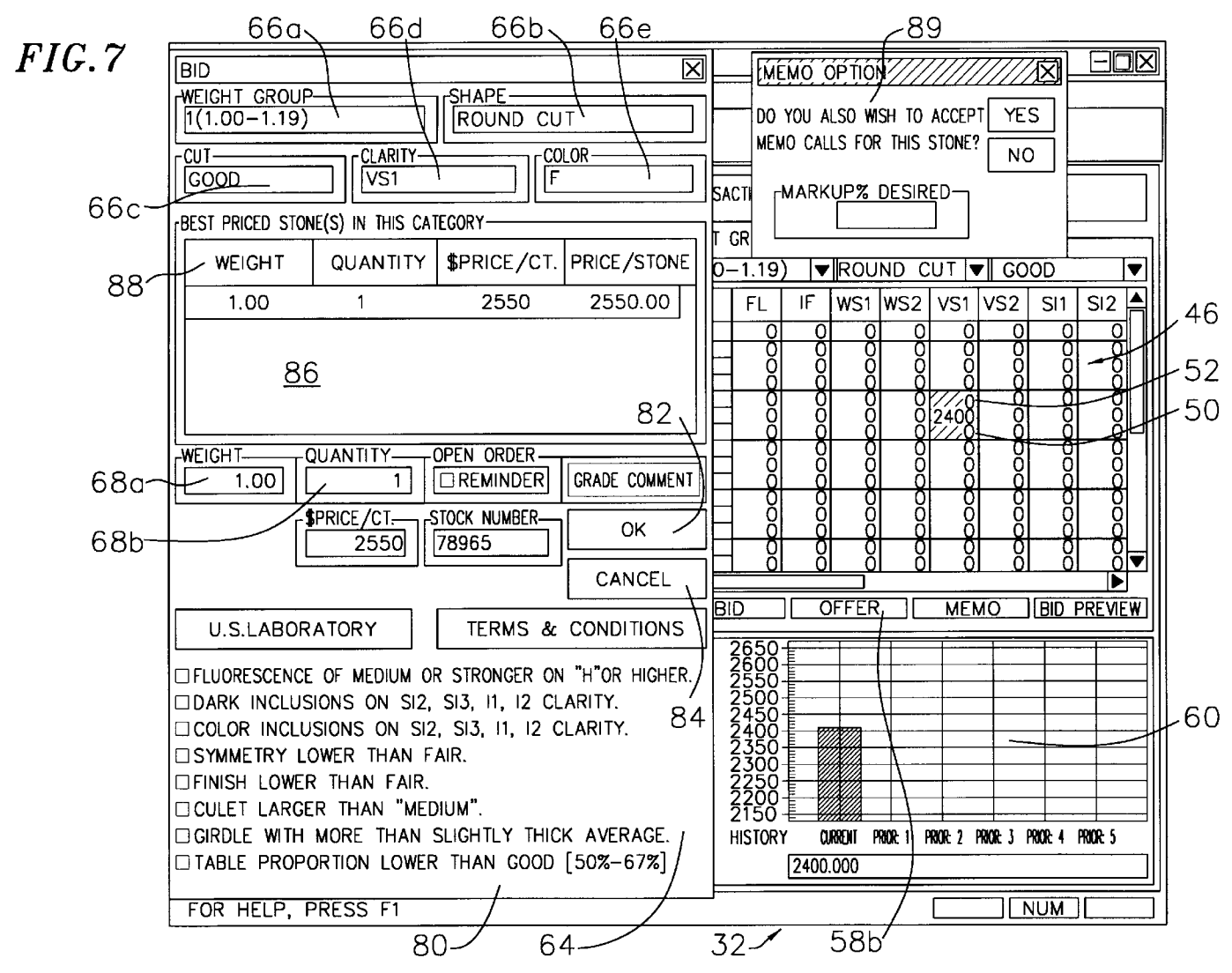

With reference to FIGS. 6 and 7, the operation of the system 10 and method according to the present invention will be described with reference to a seller wishing to use the system 10 and method of the present invention to offer a specific diamond for sale. To do so, the seller having established communication with the host processor 12 from their terminal 26a–26c would select the appropriate array category, e.g. category 50, and the offer button 58b as by using a mouse selector, that selection transmitted over the link 24 to the host processor 12 and prompting the processor 28 software and the host processor 12 to generate at the display 30 an offer display 64. Offer display 64 includes locations 66a–66e by which display the weight class 66a, shape subclass 66b, cut sub-subclass 66c, clarity 66d and color 66e corresponding to the array category 50 (FIGS. 7 and 19). At locations 68a–68d, positions are provided on the graphic offer display 64 for the seller to input the actual weight, at location 68a, the number of stones at that weight at location 68b the offer price per carat at 68c and if desired at location 68d a stock number for the diamond. By way of illustration, in FIG. 7 the seller is offering a stone for sale which would fall into the array category 50 which has been highlighted in the array window 46 of the data matrix array. It is to be understood that depending upon the characteristics of the stone including its weight and other factors, the seller would select the corresponding array and array position within which to post the data for the stone to be offered for sale. If the seller has selected the inappropriate category, an error signal is generated and displayed. Once the seller has input the data at the locations 68a–68d, he enters the data whereupon the data is transmitted with the seller's identification data as a data stream or packet to the host processor 12.

Figure 8:
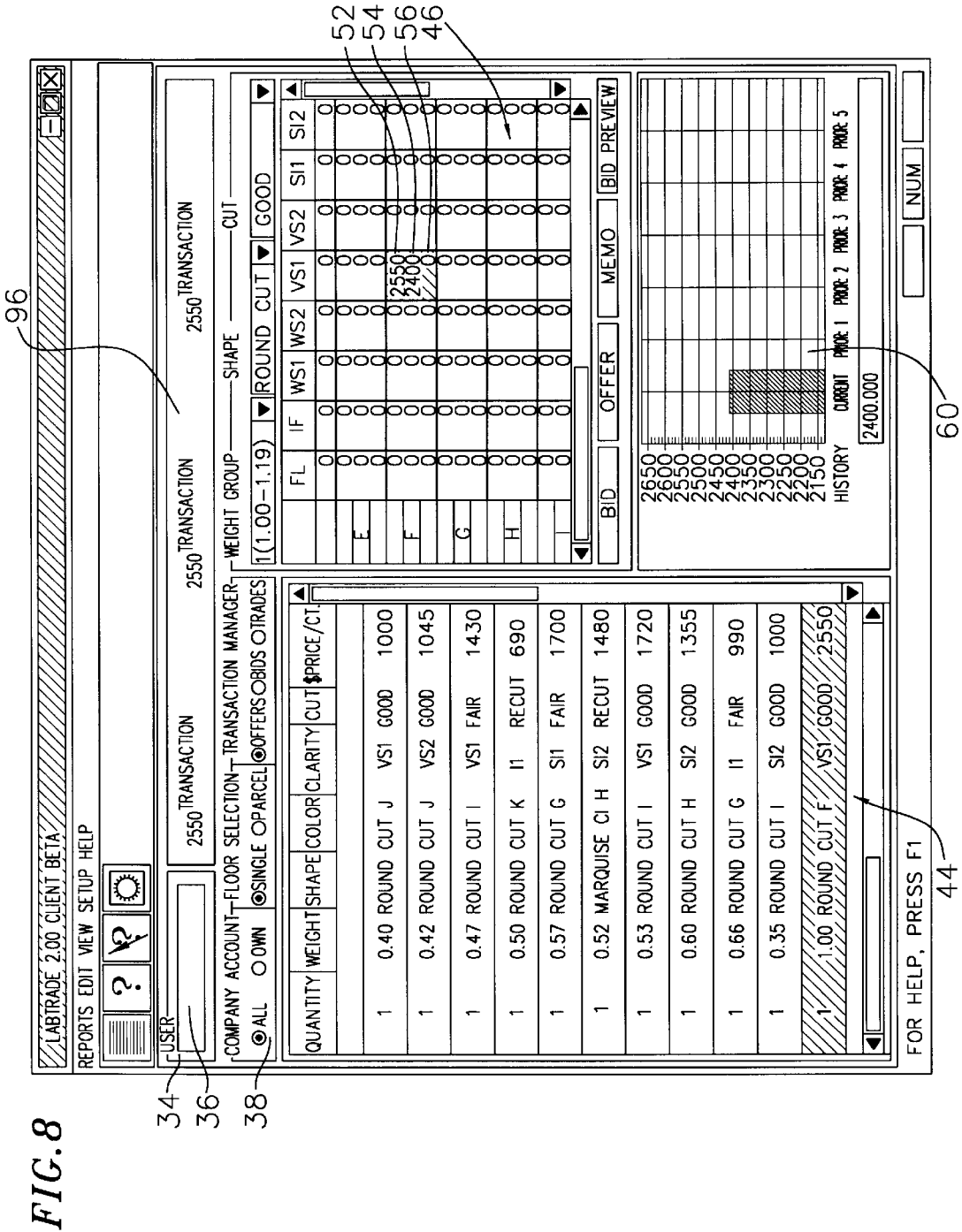
FIG. 8 shows the master display of FIG. 7 illustrating the entry of an offer illustrated in FIG. 7.

The host processor 12 in response to receipt of the data of stone offered for sale, arranges the data to be retrievable from the corresponding array category, e.g. category 50. As illustrated in FIG. 8, category 50 now shows the stone offered for sale in FIG. 7 has been entered into the system 10 whereupon its price per carat entered at location 68c is displayed as offer price 52.

Figures 2, 3:
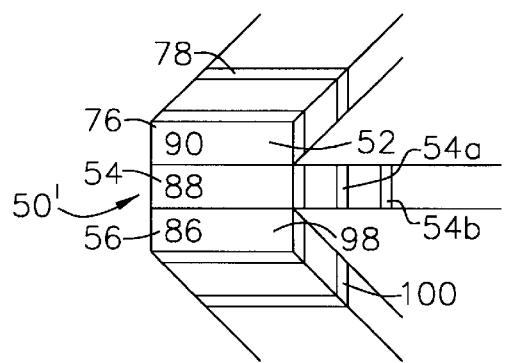
FIG. 2 illustrates an exemplar of a data matrix array presented according to the present invention.
FIG. 3 graphically represents the arrangement of data for a category position of the data matrix array of FIG. 2.

With reference to FIGS. 2 and 3, the host processor 14 in response to receipt of a data string or packet relating to a diamond to be offered for sale, arranges the data to be accessible and retrievable by selection of the corresponding array category. In addition to arranging the data and storing it for its accessibility and retrievability, the host processor 12 also compares the offer price from the newly listed diamond data to other offer prices of data assigned to that particular category, e.g. category 50. As illustrated in FIG. 3, a category 50' graphically illustrates the arrangement of data in a particular category. The host processor 12 is programmed to compare the offer prices from the data assigned to the category 50' to determine the lowest offer price. The data packet concerning the diamond having the lowest offer price for the category 50 is assigned a primary offer position 76 and its offer price is posted at the array window 46 as offer price 52 of the category 50'. Preferably the host processor 14 is programmed to arrange the data in the first data structure for each category 50' based upon ascending offer prices. That is, with reference to FIG. 3, the next lowest offer price for a diamond assigned to the category 50' would be assigned to a secondary data position 78. While not shown in FIG. 3, the remaining stones offered for sale in the category 50 would be arranged in the like manner of ascending offer prices.

With reference to FIG. 2, there is illustrated at least for some of the categories of the displayed data matrix array 22' offer prices 52, sales prices 54 and bid prices 56 which may be prevailing during use of the system and method according to the present invention. It is to be understood that each category of the array 26' may include the aforementioned data.

Returning to FIG. 8, since under the example described no other stones were listed in the category 50 in the array window 46, the stone offered for sale as described with reference to FIG. 7 represents the lowest offer price and accordingly the offer price 52 matches the price of the stone listed. Furthermore, and with reference to FIG. 8, it is seen that in the transaction display 44 the data entered to the host processor 12 from the terminal 26 concerning the stone is also included. Again the transaction display 44 is updated for any stones being entered into the system to be offered for sale.

Returning to FIG. 7, the offer display 64 also includes a comment section 80 which prompts a seller, if appropriate, to enter comments concerning the stone to be offered for sale. The seller, by marking the appropriate box using a mouse data entry device or the like can select the applicable comments concerning the stone to be offered for sale. Once selected, along with the entry of the other data, the seller inputs the data by selecting the okay button 82 to transmit the data to the host processor 12. If the data is input incorrectly, the seller need only cancel the transaction by selecting the cancel button 84.

The comments which can be selected by the seller are as follows:

- fluorescence of medium or stronger on "H" or higher.
- dark inclusions on $SI_2$, $SI_{3, I1}$, $I_2$ clarity.
- color inclusions on $SI_2$, $SI_3$, $I_1$, $I_2$ clarity.
- symmetry lower than fair.
- finish lower than fair.
- culet larger than "medium."
- girdle with more than slightly thick average.
- table proportion lower than good (50%–67%).

When the comments are selected, that data is transmitted with the data concerning the stone to the host processor 12 and is arranged in the manner described above.

With continuing reference to the offer display 64, there is shown a category display 86. While it is shown as blank in FIG. 7, the category display 86 will show all of the stones currently offered for sale in the category 50 from lowest to highest offer price. That is, the data which the host processor 12 sends over the link 24 to the terminal for display at the category display 86 is the offer data as arranged with reference to FIG. 3. The category display 86 includes headers 88 for weight, quantity, price/carat and price/stone. This data is useful for both buyers and sellers to determine the range of stones and prices offered in a particular category of the displayed data matrix array.

The software at the users terminal 26 enables the user to select a memo option for the sale of the stone. According to industry standards, a memo option is in the nature of a consignment arrangement whereby the seller of the stone provides the stone to a potential buyer for a limited time period, e.g. five days. If the buyer is able to sell the stone, the buyer remits the price to the seller. As is indicated by inclusion of "memo option" at header 88 generated at the terminal display 30, sellers typically increase the price of the stone if a memo option is offered since the stone is not actually sold but is out of circulation during the memo or consignment period. If the seller wishes to make the stone available on memo, they select the memo option and input the mark-up for a memo in the appropriate location in the memo location 89. If they do not wish to provide a memo option, they select the no option. Once all of the data concerning the stone, comments and the memo option is made, the seller enters the data whereupon the data is sent over the link 24 to the host processor 12 and arranged as described above. The data as so arranged, also includes the seller's identification data as well as the memo option, if selected. Thus for any particular category 50, a potential buyer can view the stones offered for sale in the category display 86. If the buyer wishes to see the stones which are offered on memo in any particular category 50, they select the appropriate category, e.g. category 50, and select the memo option at location 89 whereupon at the transaction display 44 all stones available on memo will be listed as well as the price.

As can be appreciated, potential buyers can select classes, arrays and categories to examine the stones that are offered for sale. It is to be noted that the display of data does not include data identifying the seller. This data is accessed only when a sale (or memo) is consummated. Furthermore, in each of the array categories, the lowest offer price is displayed. Potential buyers can select the category to obtain a display of the data concerning all stones offered for sale in that category and can determine which stones, if any, are offered on memo.

Entering A Bid/Purchasing A Stone

Figure 9:
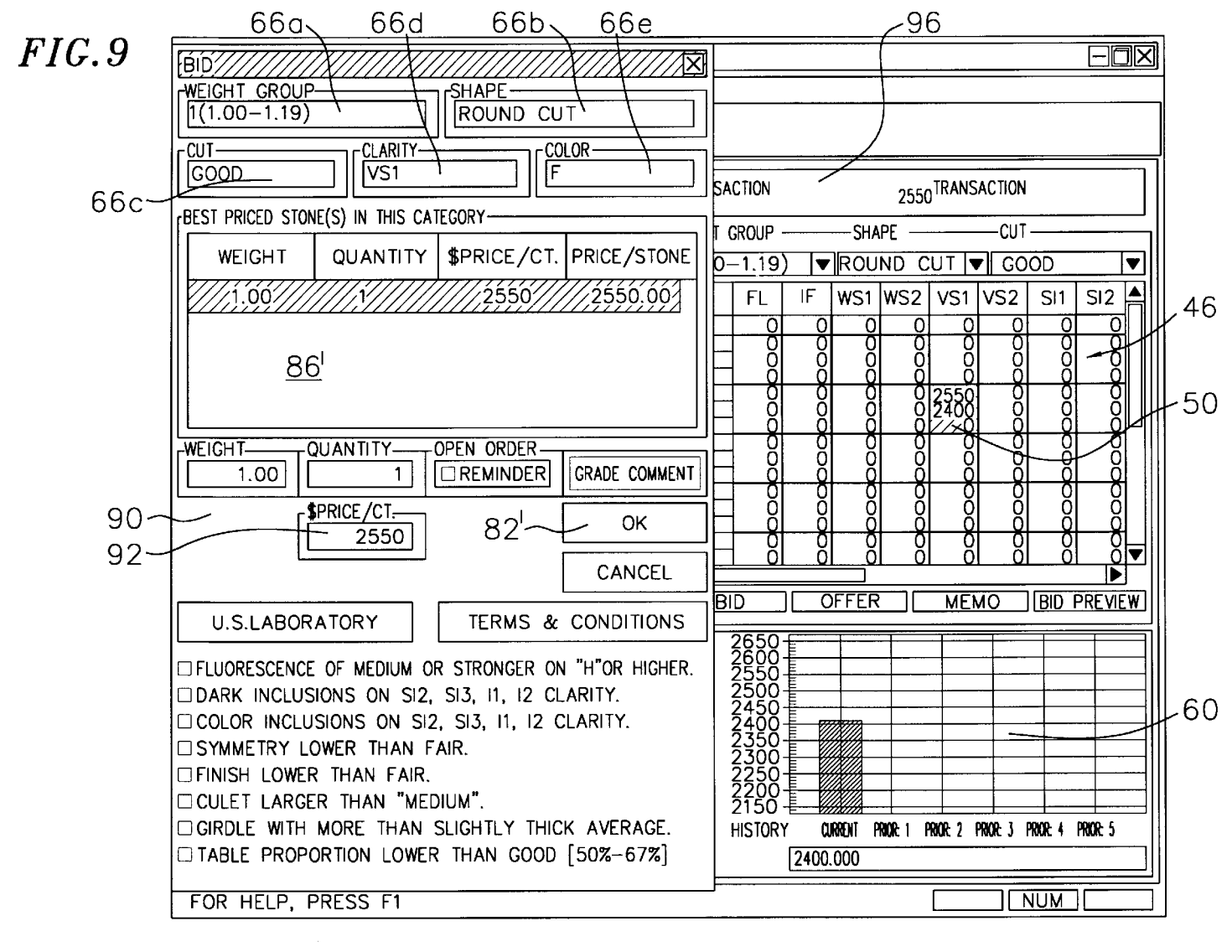

If a buyer desires to purchase a stone after establishing the link and viewing the displays described above, he selects the appropriate weight class, shape subclass, cut grade sub-subclass and the appropriate category of the displayed array 46. As shown in FIG. 9, a hypothetical buyer has selected category 50 upon the array window 46. That position corresponds to diamonds having weights between 1.00–1.19 carats, a shape of a round cut, a cut grade of good, clarity of $VS_1$ and color F. Selecting the category 50 and opting to make a bid by selecting at selection 58a and entering the selection, the processor 28 software is prompted to issue data signals to the buyer's terminal to cause it to display a bid display 90. Bid display 90 lists the weight, shape and cut grade classes as well as the clarity and color. Furthermore, in the category display 86' the host processor 12 issues data to list all stones offered for sale in that category from lowest price to highest price. only one stone is shown as listed in the category 50 of the array display and that data is shown in the category display 86'. When the data concerning the stone or selected stone of the category 50 is displayed at category display 86', the appropriate comments are indicated as well. As can be seen in FIG. 9, the stone indicated does not have any comments relative thereto. However, were there comments, the appropriate comments would be indicated by putting a mark in the box associated with the comment in the comment section 80.

The bid display 90 also displays the precise weight for the stone.

As initially displayed, and below the category display 86' at offer location 92, the sales price of the diamond whose data is assigned to the primary offer position is displayed. To make a bid on the stone less than the displayed offer price, the buyer at location 92 inputs the desired bid. The buyer then inputs the bid by selecting the okay button 82' to transmit the bid to the host processor 12. The host processor arranges the bid to the selected category 50 and compares the bid with the displayed offer price 52 of the stone data occupying the primary offer position in the category 50. If the bid price data matches the offer price data, the host processor 12 sends a signal to the terminals of the buyer and seller, as identified by the stored identification data and account information, indicating that a sale has been made. Furthermore, the clearing house maintaining the host processor 12 would send written confirmation to each of the identified buyer and seller. The host processor 12 also removes the sold stone from the data sequence assigned to category 50 and reallocates that data to a data file representing stones sold. With reference to FIG. 9, it can be seen that the buyer has input a bid at location 92 which matches the offer price 52 displayed in both the category display 86' and at category position 50. Accordingly, the host processor 12 would indicate that the buyer has purchased the stone and would manipulate the data and issue confirmation signal as described above. The host processor 12 arranges the remaining data for stones assigned to the array category 50 to determine the next lowest offer price and moves that data to the primary offer position for the category 50. With reference to FIG. 3, the stone data occupying the secondary offer position 78 would be moved to the primary offer position 76.

Figure 10:
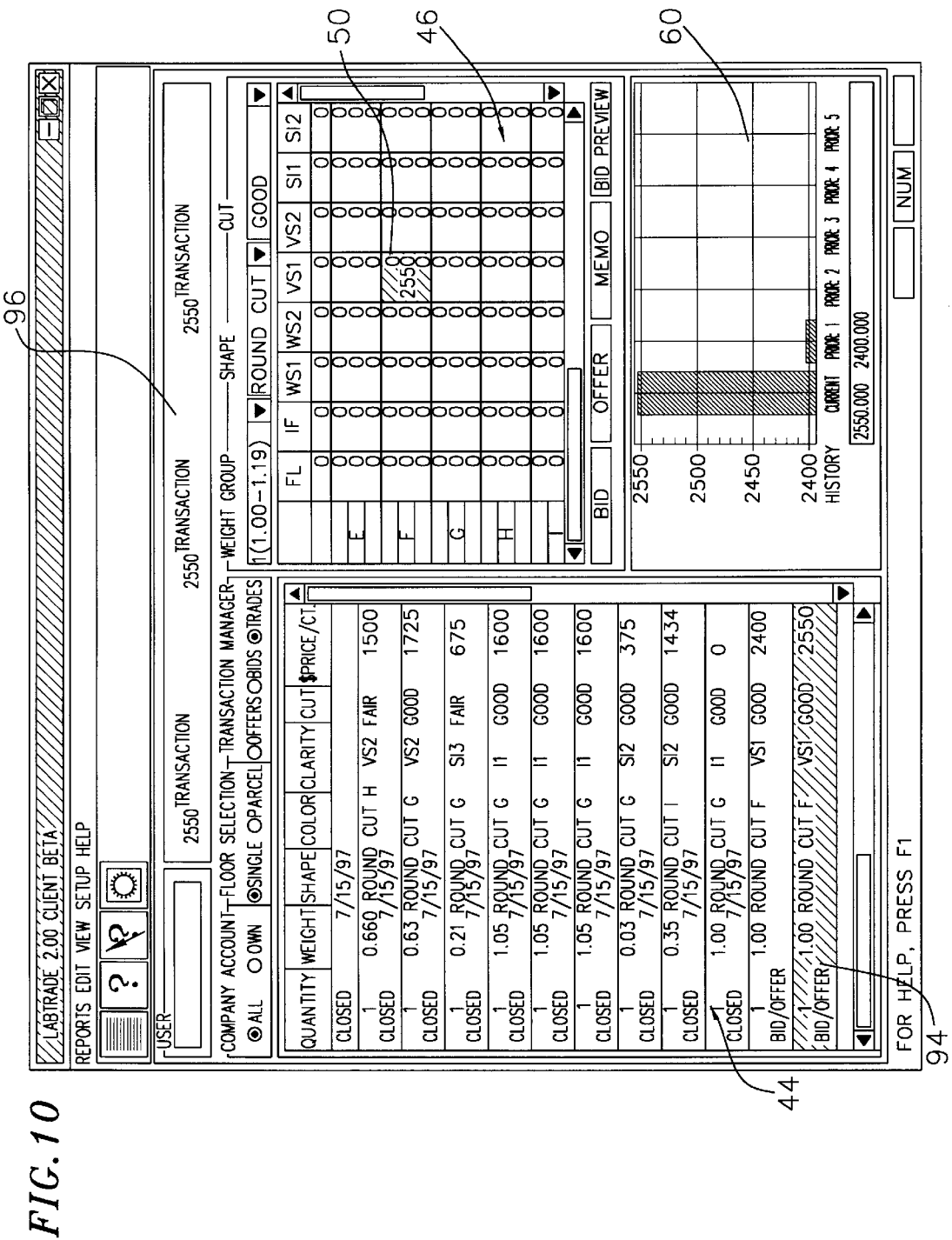
FIG. 10 is the master display of FIG. 6 showing the transaction resulting from the bid illustrated in FIG. 9.

Furthermore, the host processor 12 rewrites the sales price 54 displayed in category 50 to rewrite the most recent sale price of a stone in that category at 2550. This rewriting is shown by the master display 32 shown in FIG. 10. Since there are no more stones in this category 50, there are no displayed offer or bid prices 52, 56. Furthermore, the host processor 12 processes the data concerning the sale, to wit the sales price, and displays that sales price at chart 60. As shown in FIG. 10, chart 60 shows the most recent sales price of 2550 and the next most recent sales price of 2400. Thus, the chart 60 displays the data retained in the host processor 12 for the most current sales price and the five preceding sales prices. A buyer and seller looking at chart 60 can therefore see the price fluctuations of stones in that category 50 over time.

Furthermore, the transaction manager display 44 is prompted by data transmitted from the host processor 12 to display that the bid and offer have matched as to the stone discussed above and therefore at 94 provide a sale indicator of a matching bid and offer.

The bid preview option provided at selection 58d in FIG. 6 enables a buyer to select to make a bid subject to receipt and approval, within a certain period, of the stone. If a "bid preview" and a "bid" are received for the same price, the bid without the designated preview request takes priority. "Bid preview" is a term that is known in the art. As will become clear, "bid preview" and "bid", according to the system and method of the present invention, are substantially the same since any sale is subject to approval by the buyer.

With continuing reference to FIG. 10, the terminal 28 software creating the presentation for the master display 32 provides a ticker display 96. The host processor 12 updates the data displayed, in a ticker fashion, across the ticker display 96 to show the latest sales, the bid for the bid assigned to the primary bid physician and the offer price for the diamond data assigned to the primary offer position in the selected category 50.

In response to receipt of a bid, if the bid does not match the price contained in the data assigned to the primary offer position 76, the host processor 12 stores the bid in the category 50 in a manner suggested in FIG. 3. With reference to FIG. 3, the offer price 76 is 90 and the bid price 56 is 86. Since the bid price 56 is less than the offer price assigned to the primary offer position 76, the host processor 12 stores the bid in a bid subfile corresponding to the category 50. The host processor 12 also arranges the bids in order of highest to lowest, assigning the data representing the highest bid to a primary bid position 98. The next highest bid would be assigned to the secondary bid position 100.

With continuing reference to FIG. 3, the sales price 54 data is also stored in chronological order in a sales price subfile. The most current sales price 54 is displayed at the array category. The preceding sales prices of prior transactions 54a, 54b are stored in the subfile as suggested in FIG. 3. This stored data is recalled to generate the chart 60.

A buyer or seller may change their offer or bid price by simply selecting the category, and for a seller, highlighting his diamond(s) as displayed in the transaction display 44 and changing the offer price. The seller would then transmit the revised data to the host processor 12 which would make the appropriate correction to the data and arrange the data in the manner described above, displaying the lowest offer price in the category 50. For the buyer, the buyer at the master display 32 selects to make a bid whereupon the terminal software displays the bid display 90 for the buyer to alter their bid. For example, with reference to FIG. 9, the buyer would revise the bid price appearing in the bid display 90 and transmit the data to the host processor 12. The host processor 12, in the manner described above, compares the bid price to the offer price and if there is a match effectuates the sale routine discussed above by sending confirmations to the identified buyer and seller. If the bid price is lower than the offer price, the bid is stored in the manner described above. In the following fashion, buyers and sellers can adjust their offers and bids until a sales price is agreed upon.

Figure 4:
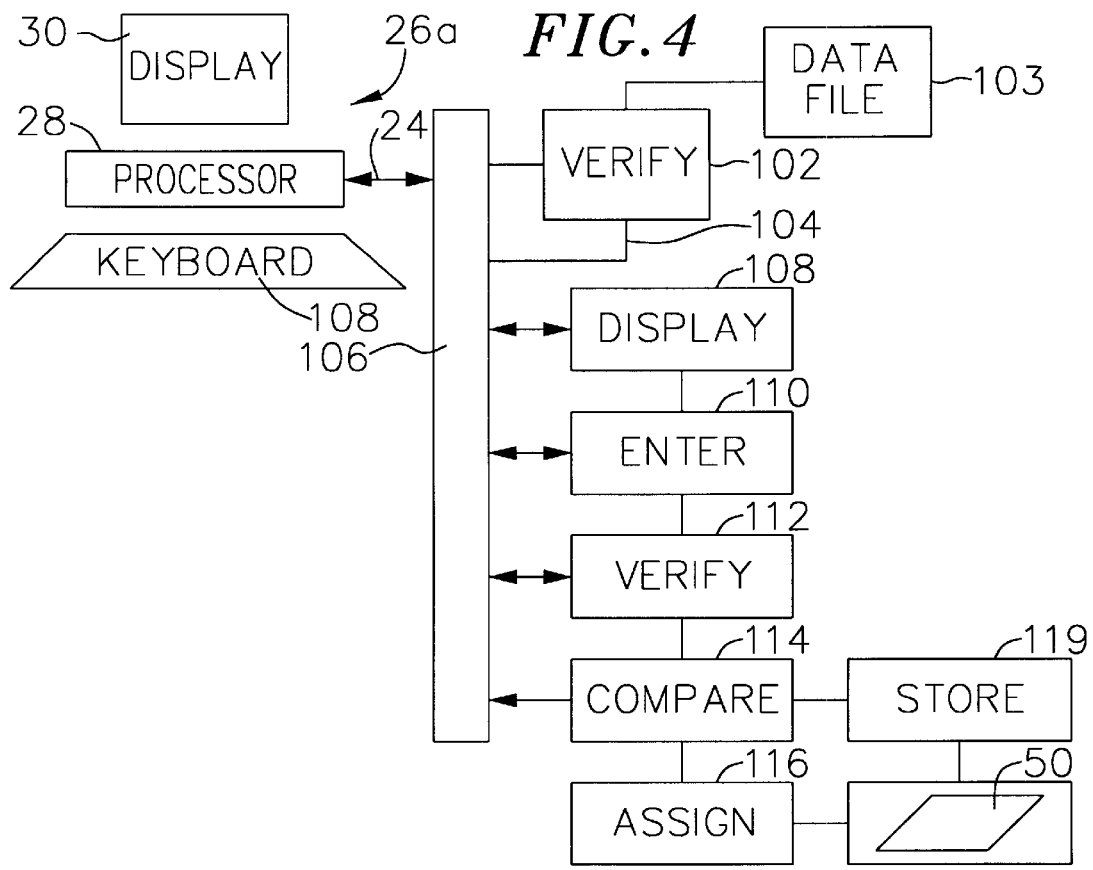
FIG. 4 illustrates a seller inputting stone data relating to a stone to be offered for sale.

With reference to FIG. 4, a logic diagram for inputting data by a seller who wishes to list a stone in the system 10 is illustrated. The seller at their terminal, e.g. terminal 26a establishes the data communication link 24 with the host processor 12. The seller inputs their user name and password data. At 102 the host processor 12 compares the user ID with a stored data file 103 of authorized users to verify that this particular user is authorized to transmit data to the host processor. Data file 103 stores user data including identification data, offer, bid and transaction data for each user. If the user is not identified, the host processor at 104 sends an error signal to a communication bus 106 which in turn communicates the error signal to the seller's terminal 26a. If the user is identified, the master display 32 is generated at the seller's terminal display 30 at 108, The offer, sale and bid prices 52, 54, 56 (FIGS. 2, 6) at each array position, and the ticker data for ticker display 96 is sent to the seller's terminal 26a for them to view. If the seller selects to enter data for a stone to be offered for sale, the seller inputs the data at a suitable data input device, shown as a keyboard 109 in FIG. 4, of the type described above and transmits that data to the host processor 12. At 110 the data is entered into the host processor 12 data files including the first data structure. The host processor 12 verifies that all the data necessary for posting a stone into the system 10 has been provided. For example, if the seller has not input the weight, at verify 112 the host processor 12 would send a signal to the seller terminal 26a informing the seller that additional data is required. After the seller has input all required data, the host processor 12 at 114 compares the offer price to the offer prices of other stones assigned to the category. If the offer price is the lowest for that category, that diamond and seller identification data is at 116 assigned to the primary offer position 76 and the offer price at 118 is displayed at the category 50. If, on the other hand, the offer is not the lowest for the category, the data is stored at 119 in the first data structure 14 in a hierarchy based upon price, lowest to highest.

Figure 5:
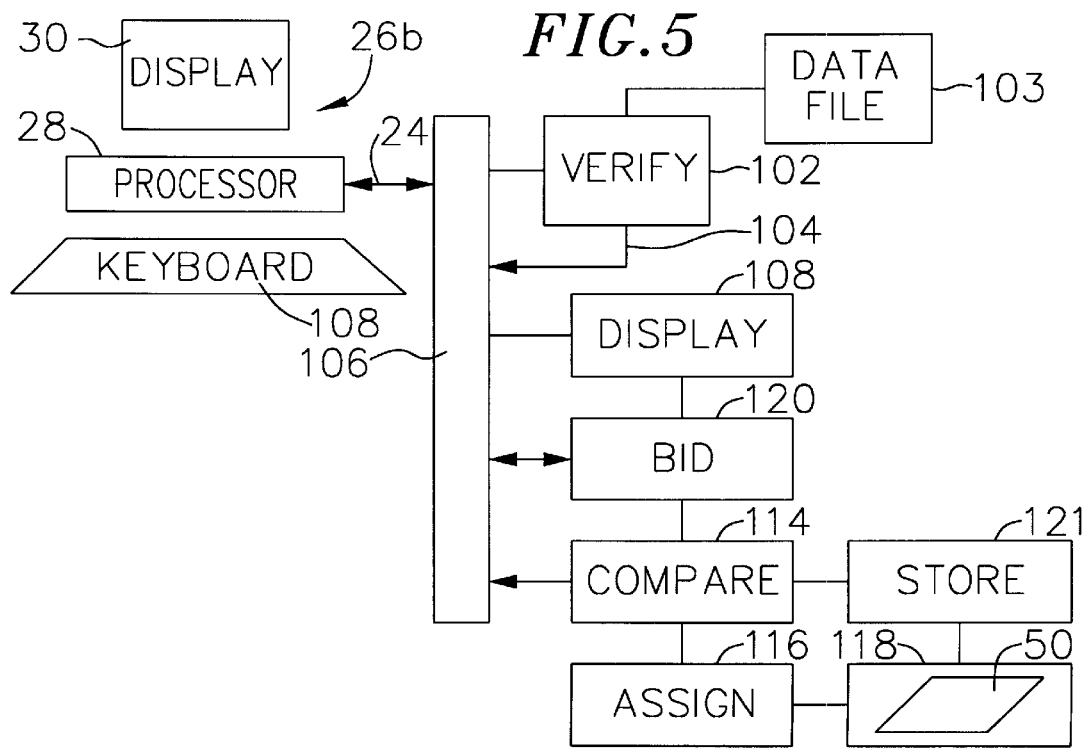
FIG. 5 illustrates a buyer inputting a bid for a stone listed according to the system and method of the present invention.

With reference to FIG. 5, the placement of the bid in the system and according to the method of the present invention is illustrated. From the buyer's terminal, e.g. terminal 26b, the buyer establishes a data link with the host processor 12 as shown by communication link 24. At 102 the host processor 12 accesses data file 103 and verifies that the buyer is authorized to access the system 10. If the buyer is not authorized as by inputting assigned identification data, at 104 an error signal is sent to the communication bus 106 which in turn transmits the error signal to the buyer's terminal. If on the other hand the buyer is recognized by the input of appropriate identification data, the host processor at 108 issues signals to display the data formatted in the manner described above and as presented according to the various views, charts and presentations as generated by the terminal 26b software. The buyer selects to make a bid, the bid option is selected and the bid is entered in the manner described above. The bid data is transmitted with the buyer's identification data through the link 24 to the bus 106 of the host processor 12 as shown at 120. The host processor at 114 compares the bid to other bids in the selected category to determine the highest bid for that category. If the bid is the highest in that category, that bid is assigned at 116 to the primary bid position in the data stored with reference to the category and is displayed at 118 as the bid price 56 appearing in the array window. If the bid is not the highest, the bid data including identification of the buyer is stored at 121 with reference to the selected category in the manner described above and in the hierarchy based upon bid price, highest to lowest.

In a further embodiment, the host processor 12 may be configured to permit a buyer to make a bid on any stone within the category. When the buyer selects the bid option and the bid window is displayed showing a corresponding category display 86, if the buyer places a bid which is lower than the lowest posted offer price, that bid would be assigned in the manner described above into the first data structure and arranged with reference to other bids in the selected category. If the buyer selects to buy a stone whose data is not assigned to the primary offer position, the buyer may purchase the stone by simply selecting that selected stone in the category display 86 and entering a bid which matches the offer price. In this fashion a buyer may buy any stone whose data is stored with reference to the selected category in the data matrix array.

Once a sale has been made by a bid and offer matching, as stated above, confirmation is issued by the host processor 12 to both the identified buyer and seller of the stone. To facilitate the handling of the transaction, the clearing house may also act as an escrow to receive the purchase funds from the buyer, including an additional fee for the clearing house, and the stone from the seller. The clearing house would then distribute funds and the stone to the seller and buyer respectively. The clearing house may also act as a laboratory to confirm that the characteristics of the stone which is the subject matter of a sales transaction match the data which was input into the system. Alternatively, the buyer may have a period of time, e.g. next business day after receipt, to rescind the sales transaction if the stone does not match the characteristics posted in the system 10.

While I have shown and described certain embodiments to the present invention, it is to be understood that it is subject to many modifications and changes without departing from the spirit and scope of the appended claims.

I claim:

1. A system for listing and facilitating transactions involving stones categorized by weight and at least one other characteristic relating to the gem comprising:

a host processor having a first data structure storing for each stone offered for sale data of stone weight, the characteristic, offer price and seller identification data, said processor including (i) means for arranging said data into a data matrix array wherein stone data for like weights and like characteristics is assigned to a designated category position in the array and (ii) means to compare the price to determine the lowest offer price for a stone offered for the category position and, for said lowest determined offered price, assigning said stone data to a primary offer position in the array category;

a plurality of remote terminals each including a display;

a data link between said terminals to said host processor by which a seller and a buyer may initiate communication with the host processor, said processor in response to initiation of communication adapted to issue signals to the terminal to display a matrix corresponding to said data matrix array and for each category the price from the stone data assigned to the primary position;

means for a seller of a stone to open communication with the host processor from a terminal and to input stone data for a stone to be offered for sale;

means for a buyer of a stone to open communication with the host processor from a terminal;

means to select a category position from the matrix at the display, said host processor in response to said selection displaying at least the stone data of weight and said characteristic for the stone data assigned to the primary position;

means for the buyer to communicate a bid to the host processor for at least the stone whose data is assigned to said primary position of the selected category; and said host processor including means to compare a bid with said displayed offer price, (i) if said bid matches the offer price said processor including means to communicate over said link to the identified seller and buyer of the stone that a sale has been made and means for removing said stone data for the sold stone from the data matrix, said comparing means comparing the prices of the remaining stone data of said category to determine the lowest price for the remaining stones and assign the lowest priced remaining stone to the primary position and (ii) if the bid is lower than the displayed offer price said processor including means to store said bid in the array category and compare said bid with other stored bids to determine the highest bid for the category, said determined highest bid assigned to a primary bid position at the array category.

2. The system of claim 1 wherein said stone data includes weight and the characteristics of color and clarity, said processor including means for defining weight classes and for each weight class a data matrix array of color and clarity, said arranging means adapted to arrange said stone data by weight class into said data matrix array wherein stone data for like weights and like characteristics of color and clarity is assigned to a designated category position in the array.

3. The system of claim 1 wherein the stone data includes the weight and the characteristics of color and stone cut shape, said processor including means for defining weight classes and for at least one weight class a plurality of shape subclasses and for each shape subclass a data matrix of color and cut, said arranging means adapted to arrange said stones data by weight class, shape subclass, color and clarity into said data matrix array wherein stone data for like weights, shapes, color and clarity is assigned to a designated category position in the array.

4. The system of claim 3 wherein the stone data also includes a cut grade, said processor including means for defining for at least one shape subclass at least one sub-subclass based upon cut grade, said arranging means adapted to arrange said stone data by weight, shape and cut grade classification into said data matrix array wherein stone data for like weights and like characteristics is assigned to a designated category position in the array.

5. The system of claim 1 wherein said processor is adapted to, in response to a selection by said category selection means, display for each stone in the category the weight, said characteristic and the offer price.

6. The system of claim 5 further including means for a buyer to select a stone of the displayed category and to enter a bid price matching the offer price, said processor including means for matching the bid with the stone and means to communicate over said link to the identified seller and buyer of the stone that a sale has been made and means for removing said stone data for the sold stone from the data matrix.

7. The system of claim 1 further including means for displaying at the terminal displays the bid price of data assigned to the primary bid position.

17

8. The system of claim 1 further including means for displaying the historical record of sales price for each category.

9. The system of claim 1 further including means for a seller to enter data concerning one or more of notations of other characteristics concerning a stone to be offered for sale selected from the group consisting of, (i) fluorescence, (ii) dark inclusions, (iii) color inclusions, (iv) symmetry, (v) finish, (vi) culet proportion, (vii) girdle proportion and (viii) table proportion, said processor including means for displaying any notation data when the stone data is displayed.

10. A system for listing and facilitating transactions involving polished diamonds categorized by weight group, cut style, cut grade, color and clarity comprising:

a host processor having a data structure storing for each diamond offered for sale data of weight, cut shape, cut grade, color and clarity, offer price and seller identification data, said processor including (i) means for arranging said data into weight group classes, cut shape subclasses and cut grade sub-subclasses and for each sub-subclass a data matrix array for color and clarity wherein data for like diamonds of the same sub-subclass, color and clarity is assigned to a designated category position in the array and (ii) means to compare the price to determine the lowest offer price for a diamond offered for the category position and, for said lowest determined offered price, assigning said data to a primary offer position in the array category;

a plurality of remote terminals each including a display;

a data link between said terminals to said host processor by which a seller and a buyer may initiate communication with the host processor, said processor in response to initiation of communication adapted to issue signals to the terminal to display for each sub-subclass a matrix corresponding to said data matrix array and for each category the price from the data assigned to the primary position;

means for a seller of a gem to communicate to the host processor from a terminal identification data to initiate communication with the host processor and to input data for a diamond to be offered for sale;

means for a buyer to communicate to the host processor from a terminal identification data to initiate communication with the host processor;

means to select a weight group, cut shape and cut grade, said processor in response to said selection adapted to issue signals to display said corresponding data matrix at the terminal display;

means for the buyer to communicate a bid to the host processor for at least the diamond whose data is assigned to said primary position of the selected category; and said host processor including means to compare a bid with said displayed offer price, (i) if said bid matches the offer price said processor including means to communicate over said link to the identified seller and buyer of the diamond that a sale has been made and means for removing said data for the sold diamond from the data matrix, said comparing means adapted to compare the prices of the remaining data of said category to determine the lowest price for the remaining diamonds and assign the lowest priced remaining diamond to the primary position and (ii) if the bid is lower than the displayed offer price said processor including means to store said bid in the array category and compare said bid with other stored bids to determine the highest bid for the category, said determined highest bid assigned to a primary bid position at the array category.

11. The system of claim 10 wherein said processor is adapted to, in response to a selection by said category selection means, display for each diamond in the category the weight, color, clarity and the offer price.

12. The system of claim 11 further including means for a buyer to select a diamond of the displayed category and to enter a bid price matching the offer price, said processor including means for matching the bid with the diamond and means to communicate over said link to the identified seller and buyer of the diamond that a sale has been made and means for removing said data for the sold diamond from the data matrix.

13. The system of claim 10 further including means for storing at least the last sales price for a diamond of each category and means for displaying with the primary bid the last sales price.

14. The system of claim 13 further including means for displaying the historical record of sales prices for diamonds sold for each category.

15. The system of claim 10 further including means for a seller to enter notation data selected from the group consisting of, (i) fluorescence, (ii) dark inclusions, (iii) color inclusions, (iv) symmetry, (v) finish, (vi) culet proportion, (vii) girdle proportion and (viii) table proportion, said processor including means for displaying any notation data when the data is displayed.

16. A method for listing and facilitating transactions involving stones categorized by weight and at least one other characteristic relating to the gem comprising:

providing a host processor having a data structure storing for each stone offered for sale data of stone weight, the characteristic, offer price and seller identification data, said processor (i) arranging said data into a data matrix array wherein stone data for like weights and like characteristics is assigned to a designated category position in the array and (ii) comparing the price to determine the lowest offer price for a stone offered for the category position and, for said lowest determined offered price, assigning said stone data to a primary offer position in the array category;

linking terminals each including a display and data entry device to said host processor by which a seller and a buyer may initiate communication with the host processor, said processor in response to initiation of communication issuing signals to the terminal to display a matrix corresponding to said data matrix array and for each category the price from the stone data assigned to the primary position;

a seller of a stone communicating to the host processor from a terminal identification data to initiate communication with the host processor and inputting stone data for a stone to be offered for sale;

a buyer of a stone communicating with the host processor from a terminal identification data to initiate communication with the host processor;

the buyer communicating a bid to the host processor for at least the stone whose data is assigned to said primary position of the selected category; and said host processor comparing the bid with said displayed offer price, (i) if said bid matches the offer price said processor confirming over said link to the identified seller and buyer of the stone that a sale has been made and removing said stone data for the sold stone from the data matrix and comparing the prices of the remaining stone data of said category to determine the lowest price for the remaining stones and assign the lowest priced remaining stone to the primary position and (ii) if the bid is lower than the displayed offer price said processor storing said bid in the array category and comparing said bid with other stored bids to determine the highest bid for the category and assigning the highest bid assigned to a primary bid position at the array category.

17. The method of claim 16 further including displaying at each category position the bid of the primary bid position.

18. A method for listing and facilitating transactions involving polished diamonds categorized by weight group, cut style, cut grade, color and clarity comprising:

providing a host processor having a data structure storing for each diamond offered for sale data of weight, cut shape, cut grade, color and clarity, offer price and seller identification data, said processor (i) arranging said data into weight group classes, cut shape subclasses and cut grade sub-subclasses and for each sub-subclass a data matrix array for color and clarity and allocating data for like diamonds of the same sub-subclass, color and clarity to a corresponding category position in the array and (ii) comparing the price to determine the lowest offer price for a diamond offered for each category position and, for said lowest determined offered price, assigning said data to a primary offer position in the array category;

linking remote terminals each having a display and data entry device to said host processor for initiating communication with the host processor, said processor in response to initiation of communication issuing signals to the terminal to display for each sub-subclass a matrix corresponding to said data matrix array and for each category the price from the data assigned to the primary offer position;

a seller of a diamond communicating to the host processor from a terminal identification data to initiate communication with the host processor and inputting data for a diamond to be offered for sale;

a buyer to communicating with the host processor from a terminal identification data to initiate communication with the host processor;

choosing a sub-subclass, said processor in response to said selection issuing signals to display said corresponding data matrix;

the buyer to communicating a bid to the host processor for at least the diamond whose data is assigned to said primary position of the selected category; and said host processor comparing the bid with said displayed offer price, (i) if said bid matches the offer price said processor confirming to the identified seller and buyer of the diamond that a sale has been made and removing said data for the sold diamond from the data matrix and comparing the prices of the remaining data of said category to determine the lowest price for the remaining diamonds and assigning the lowest priced remaining diamond to the primary position and (ii) if the bid is lower than the displayed offer price said processor storing said bid in the array category and comparing said bid with other stored bids to determine the highest bid for the category assigning the highest bid to a primary bid position at the array category.

19. The method of claim 18 further including displaying at each category position the bid of the primary bid position.

20. The method of claim 19 further including displaying at each category the most recent sale price for a diamond that has been sold.

21. The method of claim 20 further including displaying the history of sales over time for each category.

* * * * *